US012528388B2

(12) United States Patent
Blomgren et al.

(10) Patent No.: US 12,528,388 B2
(45) Date of Patent: Jan. 20, 2026

(54) COMPUTER-IMPLEMENTED METHOD FOR CONTROLLING A POWER SYSTEM OF A VEHICLE (71) Applicant: Volvo Truck Corporation, Gothenburg (SE)

(72) Inventors: Fredrik Blomgren, Hisings Kärra (SE); Linus Nordholm, Gothenburg (SE); Tobias Smidebrant, Gothenburg (SE); Eva Skvor, Mölndal (SE); Martin Wilhelmsson, Torslanda (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 66 days.

(21) Appl. No.: 18/442,471

(22) Filed: Feb. 15, 2024

(65) Prior Publication Data
US 2024/0278691 A1 Aug. 22, 2024

(30) Foreign Application Priority Data
Feb. 21, 2023 (EP) ...................................... 23157806

(51) Int. Cl.
*B60L 58/31* (2019.01)
*B60L 58/40* (2019.01)
*B60W 10/26* (2006.01)

(52) U.S. Cl.
CPC ............. *B60L 58/40* (2019.02); *B60W 10/26* (2013.01)

(58) Field of Classification Search
CPC ...... B60L 58/40; B60L 58/31; B60L 2260/22; B60L 2260/26; B60L 58/13; B60L 58/33;
(Continued)

(56) References Cited

U.S. PATENT DOCUMENTS

| 6,794,844 | B2 * | 9/2004 | Hochgraf | H01M 8/0491 |
| | | | | 320/101 |
| 8,214,174 | B2 * | 7/2012 | Ganapathy | H01M 8/04313 |
| | | | | 702/182 |

(Continued)

FOREIGN PATENT DOCUMENTS

| CN | 112959922 A | 6/2021 |
| EP | 1086847 A2 | 3/2001 |
| JP | 2009140706 A | 6/2009 |

OTHER PUBLICATIONS

Extended European Search Report, European Application No. 23157806.3, mailed Aug. 4, 2023. 9 pages.
(Continued)

*Primary Examiner* — Masud Ahmed
(74) *Attorney, Agent, or Firm* — Sage Patent Group (57) ABSTRACT

A computer system and a method for controlling a power system of a vehicle is disclosed. The power system includes a fuel cell system and an energy storage system comprising one or more batteries. The method includes predicting an upcoming driving event associated with a start time and a time duration, the driving event being an event during which the vehicle is expected to be operated under a load condition. The method further includes determining a preferred operating condition of the fuel cell system during the predicted upcoming driving event based on the load condition and on the time duration, and controlling the power system by performing a preparation action associated with the power system in dependence of the determined operating condition of the fuel system before the start time of the predicted upcoming driving event.

12 Claims, 4 Drawing Sheets

(58) Field of Classification Search
CPC ............. B60L 2240/80; B60L 2260/54; B60L 2260/58; B60L 50/75; B60L 58/30; B60W 10/26; H01M 8/04626; H01M 2250/20; H01M 8/04303; H01M 8/04619; H01M 8/0494; H01M 8/04947; H01M 8/04955; H01M 8/04992; H01M 16/006; Y02E 60/50; Y02T 90/40
See application file for complete search history.

(56) References Cited

U.S. PATENT DOCUMENTS

| | | | | |
|---|---|---|---|---|
| 8,920,995 | B2* | 12/2014 | Lebzelter | H01M 8/04865 |
| | | | | 429/432 |
| 9,496,735 | B2* | 11/2016 | Sarkar | B60L 58/16 |
| 12,233,750 | B2* | 2/2025 | Igarashi | B60L 50/75 |
| 12,304,332 | B2* | 5/2025 | Ryu | B60L 58/40 |
| 2003/0044658 | A1* | 3/2003 | Hochgraf | H01M 16/006 |
| | | | | 429/432 |
| 2013/0034787 | A1* | 2/2013 | Miyata | H01M 8/04798 |
| | | | | 429/429 |
| 2014/0277931 | A1 | 9/2014 | Crowe | |
| 2016/0046204 | A1* | 2/2016 | Oh | B60L 58/40 |
| | | | | 701/22 |
| 2016/0114781 | A1 | 4/2016 | Fink et al. | |
| 2021/0162885 | A1* | 6/2021 | Braun | H01M 8/04201 |

OTHER PUBLICATIONS

European Office Action, European Patent Application No. 23157806.3, mailed Jul. 11, 2025, 8 pages.

* cited by examiner 110  120  130

Fig. 5

COMPUTER-IMPLEMENTED METHOD FOR CONTROLLING A POWER SYSTEM OF A VEHICLE

CROSS REFERENCE TO RELATED APPLICATIONS

This application claims priority to European Patent Application No. 23157806.3, filed on Feb. 21, 2023, the disclosure and content of which is incorporated by reference herein in its entirety.

TECHNICAL FIELD

The disclosure relates generally to control of a power system of a vehicle. In particular aspects, the disclosure relates to a computer-implemented method for controlling a power system which comprises a fuel cell system and an energy storage system. The disclosure also relates to a computer system, a computer program product, a control system, a non-transitory computer readable storage medium and a vehicle. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

In recent years, fuel cell systems have been considered as one of power sources for producing electric power in different applications, e.g., in fuel cell electric vehicles. Typically, a fuel cell system is used together with an energy storage system for providing electric power to various components of the fuel cell electric vehicle. The electric power may be used for powering one or more electric motors for creating a propulsion force to the vehicle. It may also be used for energizing auxiliary power consumers, such as an electric motor for an air conditioning system of the vehicle. The electric motors and the auxiliary power consumers may be regarded as energy consumers of the vehicle, and during operation of the vehicle, there may be various power demands from the energy consumers.

For example, when the vehicle is operated in a low load condition (i.e., an idling state), the power demands from the energy consumers are generally relatively low, and the fuel cell system may be turned off during the low load operating condition, in order to save fuel as well as to reduce wear of fuel cell stacks. The fuel cell system may have to be turned on again when the energy storage system is not able to produce sufficient electric power. However, frequently turning on and off the fuel cell system may accelerate an ageing process of the fuel cell stacks of the fuel cell system. The ageing process may reduce a fuel cell system efficiency and thereby may lead to a direct increase in fuel consumption. It may also reduce a service life of the fuel cell system.

In view of the above, it has been realized that there is a need to develop improved technology relating to the control of a fuel cell system and an energy storage system, especially when the vehicle is operated in a certain load condition.

SUMMARY

According to a first aspect of the disclosure, a computer system comprising a processor device configured to control a power system of a vehicle according to claim 1 is provided. The power system comprises a fuel cell system and an energy storage system comprising one or more batteries, wherein the fuel cell system and the energy storage system are adapted to produce electric power for one or more energy consumers of the vehicle. The processor device is further configured to:
predict an upcoming driving event associated with a start time and a time duration, the driving event being an event during which the vehicle is expected to be operated under a load condition,
determine a preferred operating condition of the fuel cell system during the predicted upcoming driving event based on the load condition and on the time duration, the preferred operating condition corresponding to one of keeping the fuel cell system running or turning off the fuel cell system, and
control the power system by performing a preparation action of the power system in dependence of the determined preferred operating condition of the fuel system, wherein the preparation action is performed before the start time of the predicted upcoming driving event.

The first aspect of the disclosure may seek to find an in at least some aspects improved computer system for controlling the power system. A technical benefit may include that by performing a preparation action in dependence on the preferred operating condition, i.e. to either keeping the fuel cell system running or turning off the fuel cell system, the fuel cell system and/or the energy storage system may be better prepared for the upcoming driving event. As a result, by way of example, unnecessary degradation of the fuel cell system may be avoided, and/or less energy may be wasted.

The determination of the preferred operation condition is based on the prediction of the upcoming driving event associated with a start time and a time duration. For example, by turning off the fuel cell system, it may be possible to save fuel as well as reduce wear of the system. However, the action of turning on/off the fuel cell system itself may accelerate the aging process. Therefore, it may be advantageous to assess a tradeoff between the benefit of fuel economy and the drawback of acceleration of the aging process. As such, in some examples, determine a preferred operating condition of the fuel cell system during the predicted upcoming driving event based on the load condition and on the time duration may comprise: assessing a tradeoff between fuel economy and an acceleration of the aging process of the fuel cell system. In some examples, during a short driving event, the fuel saved may not be as considerable as the degradation of the fuel cell system. In this case it may be preferable to keep the fuel cell system running, while in other scenarios it may be the opposite. In this way, the fuel cell system may not have to be turned off when it is unnecessary, and the degradation of the fuel cell system may be further reduced.

The driving event herein is to be understood as an event during which the vehicle is expected to be operated under a load condition. A load during the load condition may be lower than a threshold value, and/or fulfil a criterion. For example, being below the threshold value and/or fulfilling the criterion may correspond to that the vehicle is not moving or the vehicle is parked with an ignition switch in an on state (i.e., idling state). Thus, the driving event is not solely limited to instances where the vehicle is in motion. Instead, it may encompass all situations in which various vehicle subsystems and components are driven by a power source and are in a driven state. During such a driving event, a required power from one or more energy consumers may be relatively low and therefore it may be possible to operate the vehicle completely by the energy storage system when the fuel cell system is turned off. In this case, it may only need to turn off and on the fuel cell system one time during the driving event.

According to a second aspect of the disclosure, a computer-implemented method for controlling a power system of a vehicle by a processor device according to claim 2 is provided. The power system comprises a fuel cell system and an energy storage system comprising one or more batteries, wherein the fuel cell system and said energy storage system are adapted to produce electric power for one or more energy consumers of the vehicle. The method comprises:

predicting, by the processor device, an upcoming driving event associated with a start time and a time duration, the driving event being an event during which the vehicle is expected to be operated under a load condition, determining, by the processor device, a preferred operating condition of the fuel cell system during the predicted upcoming driving event based on the load condition and on the time duration, the operating condition corresponding to one of keeping the fuel cell system running or turning off the fuel cell system, and controlling, by the processor device, the power system by performing a preparation action of the power system in dependence of the determined operating condition of the fuel system, wherein the preparation action is performed before the start time of the predicted upcoming driving event.

The second aspect of the disclosure may seek to find an in at least some aspects improved method for controlling the power system. A technical benefit may include that by performing a preparation action in dependence on the preferred operating condition, i.e. to either keeping the fuel cell system running or turning off the fuel cell system, the fuel cell system and/or the energy storage system may be better prepared for the upcoming driving event. As a result, by way of example, unnecessary degradation of the fuel cell system may be avoided, and/or less energy may be wasted.

The determination of the preferred operation condition is based on the prediction of the upcoming driving event associated with a start time and a time duration. For example, by turning off the fuel cell system, it may be possible to save fuel as well as reduce wear of the system. However, the action of turning on/off the fuel cell system itself may accelerate the aging process. Therefore, it may be advantageous to assess a tradeoff between the benefit of fuel economy and the drawback of acceleration of the aging process. As such, in some examples, determine a preferred operating condition of the fuel cell system during the predicted upcoming driving event based on the load condition and on the time duration may comprise: assessing a tradeoff between fuel economy and an acceleration of the aging process of the fuel cell system. In some examples, during a short driving event, the fuel saved may not be as considerable as the degradation of the fuel cell system. In this case it may be preferable to keep the fuel cell system running, while in other scenarios it may be the opposite. In this way, the fuel cell system may not have to be turned off when it is unnecessary, and the degradation of the fuel cell system may be further reduced.

The computer-implemented method as disclosed herein may be performed in the processor device, such as in one or more electronic control units. The processor device may comprise a predicting unit which is configured to predict the upcoming driving event and the start time as well as the time duration. The processor device may further comprise a communication unit for communicating the preparation action with various systems, e.g., with the fuel cell system and/or with the fuel cell system and the energy storage system.

In some examples, including in at least one preferred example, optionally, the method further comprises:

in response to determining that the preferred operating condition corresponds to keeping the fuel cell system running, estimating, by the processor device, an amount of electric power that is expected to be generated by the fuel cell system throughout the predicted time duration of the predicted upcoming driving event, and controlling, by the processor device, the power system by performing a preparation action in a way such that a state-of-energy level of the energy storage system is adjusted to a first level before the start time of the predicted upcoming driving event.

A technical benefit may include that by controlling the power system such that the state-of-energy level of the energy storage system is adjusted to the first level before the start time of the predicted upcoming driving event, a risk of wasting excessive electric power produced by the fuel cell system may be reduced. For example, by adjusting the state-of-energy level of the energy storage system to the first level before the start of the upcoming driving event, a larger amount of excessive electric power produced by the fuel cell system may be used to charge the energy storage system.

In some examples, including in at least one preferred example, optionally, the first level corresponds to a state-of-energy level which allows the energy storage system to be charged to a target state-of-energy level by a portion of the estimated electric power from the fuel cell system during the predicted upcoming driving event. Herein the portion of the estimated electric power may refer to the amount of the excessive electric power. For example, this may be determined by subtracting the actual power required from the one or more energy consumers from the estimated electric power that is expected to be generated by the fuel cell system.

In some examples, including in at least one preferred example, optionally, the target state-of-energy level corresponds to a level which is sufficient for completing a subsequent expected driving task after the predicted upcoming driving event. Additionally, or alternatively, the target state-of-energy level corresponds to a fully-charged level of the energy storage system. Herein, the fully-charged level may not necessarily refer to being charged to 100%, since keeping the energy storage system charged to its physical limit may cause it to deteriorate more quickly. Instead, it may refer to a level where the energy storage system is charged to a maximum allowable level, e.g. 85%-95%.

In some examples, including in at least one preferred example, optionally, performing a preparation action in a way such that a state-of-energy level of the energy storage system is adjusted to a first level before the start time of the predicted upcoming driving event comprises decreasing a power output from the fuel cell system. The power output from the fuel cell system may be decreased such that the power supplied by the energy storage system may be increased. In this way, the state-of-energy level of the energy storage system may be reduced quickly and may be able to be adjusted to the first level before the upcoming driving event.

Alternatively, or additionally, the state-of-energy level of the energy storage system may be adjusted by use of an energy dissipation system. The energy dissipation system may comprise a braking resistor. In this case, the electric power may be dissipated as heat. In some examples, the heat may be used for heating sections/components of the vehicle, e.g., for heating a vehicle cabin.

In some examples, including in at least one preferred example, optionally, the method further comprises:

in response to determining that the preferred operating condition corresponds to turning off the fuel cell system, controlling the power system by performing a preparation action comprises initiating a cooling action of the fuel cell system before turning off the fuel cell system.

A technical benefit may include that by initiating a cooling action of the fuel cell system before turning off the fuel cell system, the fuel cell system's temperature may be within a desirable range upon completing the driving event. The fuel cell system may thereafter be operated at a desirable operating temperature. As a result, a risk of system degradation may be further reduced. In some examples, the processor device may communicate to a cooling system to initiate the cooling action.

In some examples, including in at least one preferred example, optionally, determining the preferred operating condition of the fuel cell system comprises comparing the predicted time duration of the upcoming driving event with a reference time. The reference time may be associated with an aging factor, wherein, when a time duration is shorter than the reference time, it may cause less aging to keep the fuel cell system running than to turn off and turn on again. A technical benefit may include that by comparing the predicted time duration of the upcoming driving event with the reference time, it may be possible to determine the preferred condition that is most beneficial to the fuel cell system in terms of system aging.

In some examples, including in at least one preferred example, optionally, if the predicted time duration of the upcoming driving event is shorter than the reference time, the operating condition is determined to correspond to keeping the fuel cell system running, and if the predicted time duration of the upcoming driving event is longer than the reference time, the operating condition is determined to correspond to turning off the fuel cell system.

In some examples, including in at least one preferred example, optionally, the prediction of the upcoming driving event is based on historical driving statistics data or a pre-defined travelling plan.

According to a third aspect of the disclosure, a computer program product comprising program code for performing the method according to the second aspect of the disclosure is provided.

According to a fourth aspect of the disclosure, a control system comprising one or more control units configured to perform the method according to the second aspect of the disclosure is provided.

According to a fifth aspect of the disclosure, a non-transitory computer-readable storage medium comprising instructions is provided. The non-transitory computer-readable storage medium comprises instructions, which when executed by the processor device, cause the processor device to perform the method according to the second aspect of the disclosure.

According to a sixth aspect of the disclosure, a vehicle comprising a power system adapted to produce electric power for one or more energy consumers of the vehicle is provided. The vehicle further comprises the computer system according to the first aspect of the disclosure and/or the control system according to the fourth aspect of the disclosure.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

There are also disclosed herein computer systems, control units, code modules, computer-implemented methods, computer readable media, and computer program products associated with the above discussed technical benefits.

BRIEF DESCRIPTION OF THE DRAWINGS

With reference to the appended drawings, below follows a more detailed description of aspects of the disclosure cited as examples.

The drawings are schematic and not necessarily drawn to scale.

DETAILED DESCRIPTION

Aspects set forth below represent the necessary information to enable those skilled in the art to practice the disclosure.

Figure 1:
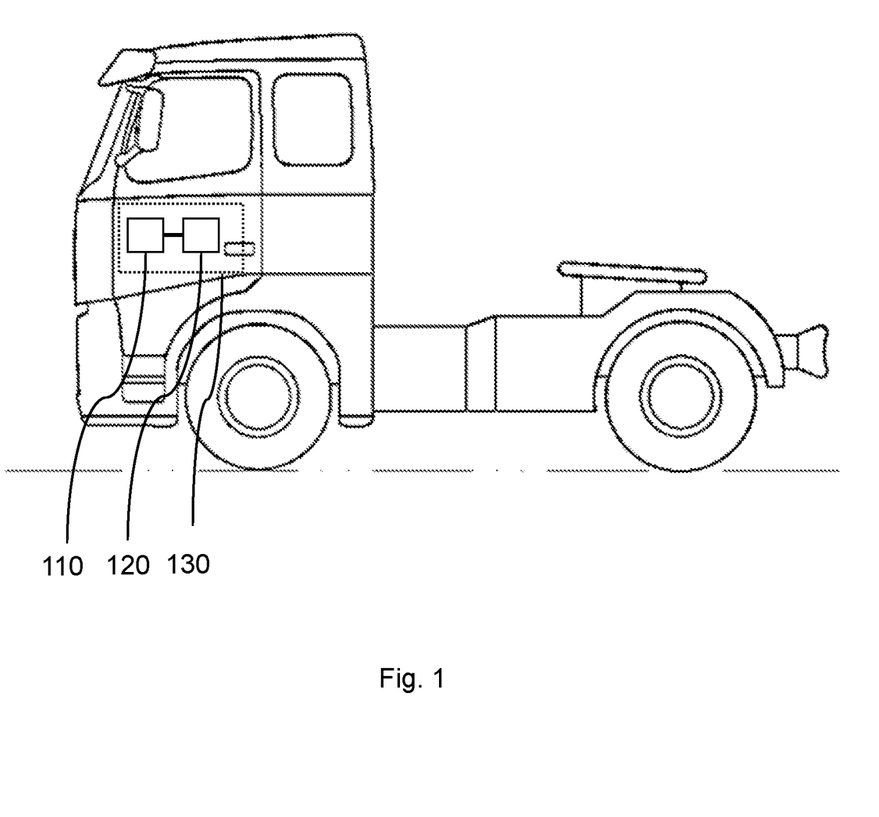
FIG. 1 is a schematic side view of an exemplary vehicle comprising a power system according to an aspect of the disclosure.

FIG. 1 depicts a vehicle 100, which is exemplified by a fuel cell electric truck. Even though a fuel cell electric truck is shown, it shall be noted that the disclosure is not limited to this type of vehicle, but it may also be used for other electric vehicles, such as a bus, construction equipment, e.g., a wheel loader or an excavator. In some examples, the vehicle may be a marine vessel, e.g., a ship or a boat.

The vehicle 100 comprises a power system 130. The power system 130 comprises a fuel cell system 110 and an energy storage system 120 comprising one or more batteries, and they are adapted to produce electric power. The electric power will then be fed to one or more energy consumers 140, for instance using one or more cables (not shown). In some examples, the one or more energy consumers 140 may comprise one or more electric motors (not shown), configured to create a propulsion force for propelling the vehicle 100 and/or for energizing auxiliary electric devices of the vehicle 100. During operation of the vehicle 100, there may be various power demands from the one or more energy consumers 140. The vehicle 100 further comprises a control system 402. The control system 402 may comprise one or more control units, which may also be referred to as one or more processor devices 402. The one or more processor devices 402 may be configured to control the power system 130 using a method according to an example of the disclosure.

In some examples, the vehicle 100 may be a transportation truck which is configured to carry out various transport missions. When performing loading and/or unloading tasks, the vehicle 100 may be parked at a loading area in an idling state, referred to as one idling stop. During the idling stop, the fuel cell system 110 may be turned off and the energy required for operating the vehicle may be completely supplied by the energy storage system 120, e.g., a battery, until a state-of-energy level of the energy storage system 120 is lower than a threshold value. Thereafter the fuel cell system 110 may be turned on again to, e.g., charge the energy storage system 120. This cycle may be referred to as a fuel cell system on/off cycle, and e.g., during an idling stop, the fuel cell system 110 may be turned off and on multiple times depending on how long the idling stop lasts and the requested power throughout the idling stop. The processor device 402 may be configured to assess a tradeoff between fuel economy and an acceleration of the aging process of the fuel cell system and determine if is preferred to keep the fuel cell system 110 running or to turn off the fuel cell system 110 during the idling stop. Accordingly, the processor device 402 may initiate a preparation action in dependence of the determined operating condition before the start of the idling stop. In some other examples, the vehicle may be construction equipment (e.g. a crane). It may be parked at a construction site performing various construction works, wherein the vehicle is operated under a relatively low load condition.

Figure 2:
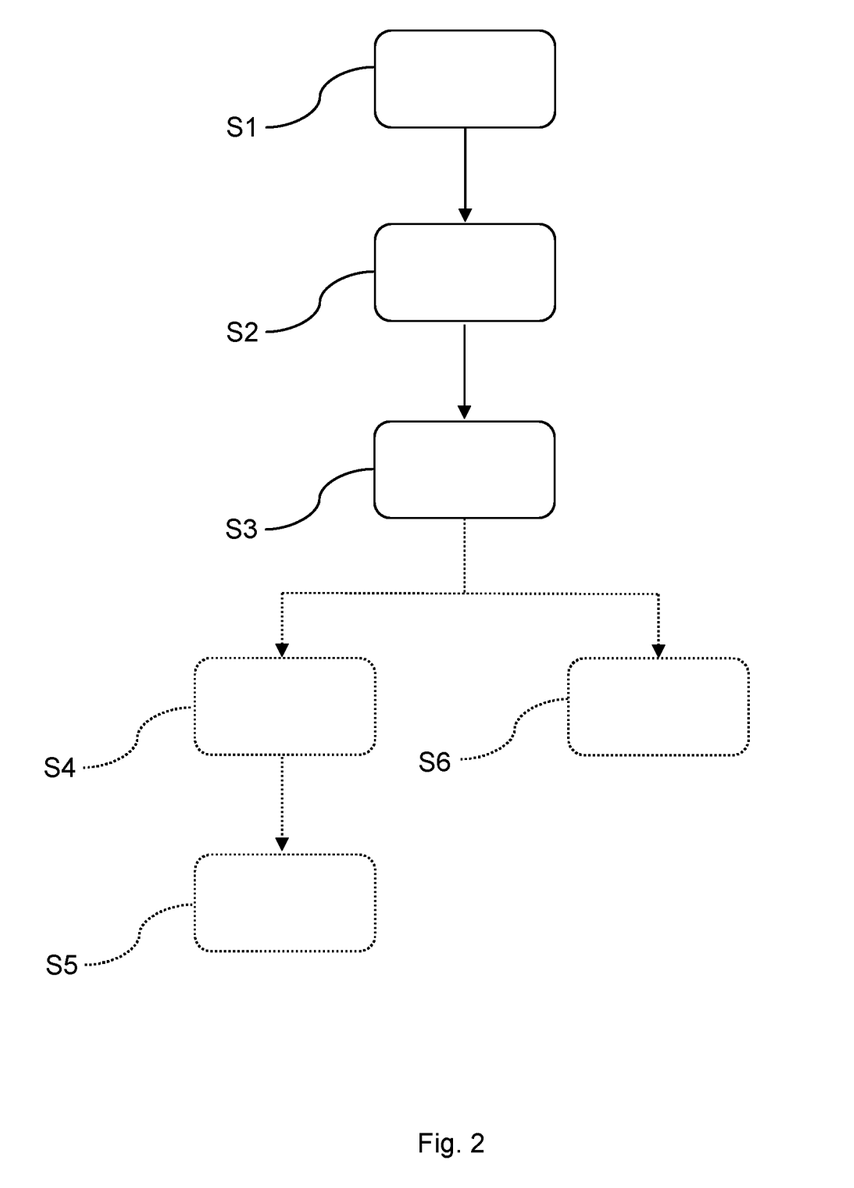
FIG. 2 is a flowchart illustrating an exemplary method of controlling the power system shown in FIG. 1.

FIG. 2 is a flowchart illustrating an exemplary method of controlling the power system 130. The method may be applied to any type of electric vehicle, e.g., the truck 100 shown in FIG. 1. The method comprises the steps listed in the following, which, unless otherwise indicated, may be taken in any suitable order. The method may be performed by the processor device 402.

S1: predicting an upcoming driving event associated with a start time and a time duration, the driving event being an event during which the vehicle 100 is expected to be operated under a load condition. The load condition may be a condition when a load is lower than a threshold value, and/or when a load fulfils a criterion. For example, the load being below the threshold value and/or the criterion may correspond to that the vehicle 100 is not moving or the vehicle is parked with an ignition switch in an on state (i.e., idling state).

Figure 3:
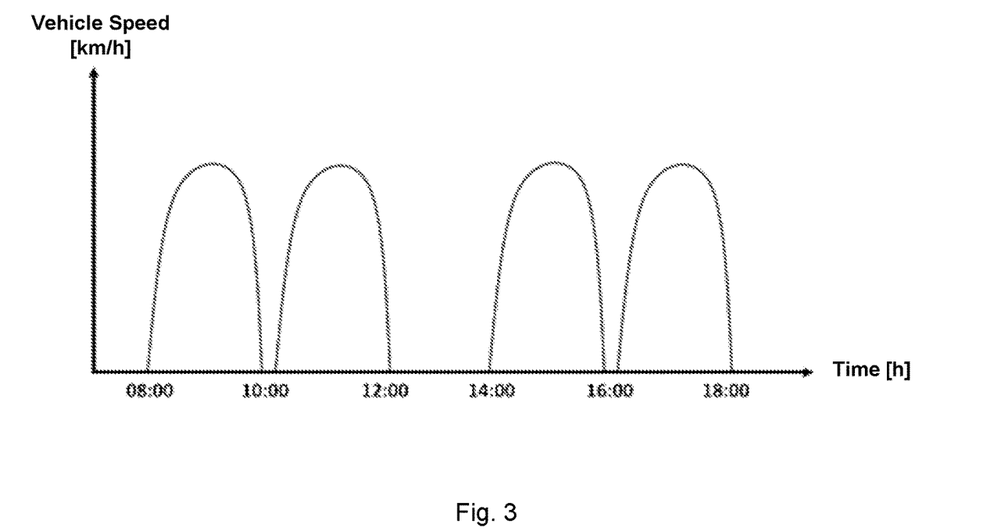
FIG. 3 is a graph showing an exemplary use of historical driving statistics data for predicting an upcoming driving event associated with a start time and a time duration.

The prediction may be made based on historical driving statistics data. FIG. 3 shows an example of historical statistics data, which illustrates a vehicle speed profile during different time periods of a day. As can be seen from FIG. 3, the vehicle 100 had two relatively short stops, with the vehicle speed being zero, around 10:00 and around 16:00, respectively. The vehicle 100 may, as an example, perform loading and unloading tasks at these times. Furthermore, the vehicle 100 had one relatively long stop between 12:00 and 14:00. As mentioned above, the vehicle 100 may be a transportation truck and it may have reoccurring driving schedule every day. It may therefore be possible to predict that the vehicle 100 is expected to take the short stop around 10:00 and around 16:00, respectively, and that it is expected to take a longer stop between 12:00 and 14:00 every day. The time duration for each stop may also be estimated according to the historical statistics data.

Alternatively, or additionally, it may be possible to predict the aforementioned information when defining a travel plan at the start of each trip. The prediction may be made by a vehicle trip planner and the associated information may be sent to the processor device 402, e.g., to a communication unit (not shown) of the processor device 402.

S2: The method further comprises determining a preferred operating condition of the fuel cell system 110 during the predicted upcoming driving event based on the load condition and on the time duration, the operating condition corresponding to one of keeping the fuel cell system 110 running or turning off the fuel cell system 110.

For example, the processor device 402 may assess a tradeoff between the benefit of fuel saving and the drawback of accelerating the aging for turning off and turning on the fuel cell system 110. The processor device 402 may evaluate a quantity of the fuel saved in comparison with a degradation of the fuel cell system 110 and therefrom determine the preferred operating condition. In some examples, the processor device 402 may compare the predicted time duration of the upcoming driving event with a reference time, wherein, when a time duration is shorter than the reference time, it may cause less aging to keep the fuel cell system 110 running than to turn off and turn on the fuel cell system 110 again. Hence, if the predicted time duration of the upcoming driving event is shorter than the reference time, the operating condition may be determined to correspond to keeping the fuel cell system 110 running, and if the predicted time duration of the upcoming driving event is longer than the reference time, the operating condition may be determined to correspond to turning off the fuel cell system 110.

S3: The method further comprises controlling the power system 130 by performing a preparation action associated with the power system 130 in dependence of the determined operating condition of the fuel system 110 before the start time of the predicted upcoming driving event.

In response to determining that the preferred operating condition corresponds to keeping the fuel cell system 110 running, the processor device may perform S4: estimating an electric power that is expected to be generated by the fuel cell system 110 throughout the predicted time duration of the predicted upcoming driving event. Based on the estimation, a preparation action may be performed in a way such that a state-of-energy level of the energy storage system is adjusted to a first level before the start time of the predicted upcoming driving event.

This is due to the factor that during an idling stop, a minimum power output from the fuel cell system 110 is usually higher than an actual power required from the one or more energy consumers 140. Excessive electric power produced by the fuel cell system 110 may be used to charge the energy storage system 120 until a state-of-energy level of the energy storage system 120 reaches a threshold level, e.g., to a maximum allowable value. The fuel cell system 110 may either be turned off or continue to produce electric power with the excessive power being wasted. By estimating the electric power that is expected to be generated by the fuel cell system 110 throughout the predicted time duration of the driving event, it may be possible to estimate a possible amount of the excessive electric power, and subsequently to adjust the state-of-energy level of the energy storage system 120 to an appropriate level in advance, such that the fuel cell system 110 may be able to transfer at least a portion of the electric power to the energy storage system 120 during the driving event, and the energy storage system 120 may not reach the threshold level until the end of the driving event. In this way, the fuel cell system 110 does not have to be turned off and no or less excessive electric power will be wasted.

The energy storage system 120 may then be charged to a target level at the end of the driving event by the excessive electric power produced by the fuel cell system 130. The target state-of-energy level may be sufficient for completing a subsequent expected driving task after the predicted upcoming driving event. Alternatively, or additionally, the target state-of-energy level may correspond to a fully-charged level of the energy storage system 120.

In some examples, the preparation action may comprise S5: decreasing a power output from the fuel cell system 110. The power output from the fuel cell system 110 may be decreased such that the power supplied by the energy storage system 120 may be increased. In this way, the state-of-energy level of the energy storage system 120 may be reduced quickly and therefore may be able to be adjusted to the appropriate level before the driving event.

Alternatively, or additionally, the state-of-energy level of the energy storage system 120 may be adjusted by use of an energy dissipation system. The energy dissipation system may comprise a braking resistor. In this case, the electric power may be dissipated as heat.

Figure 4:
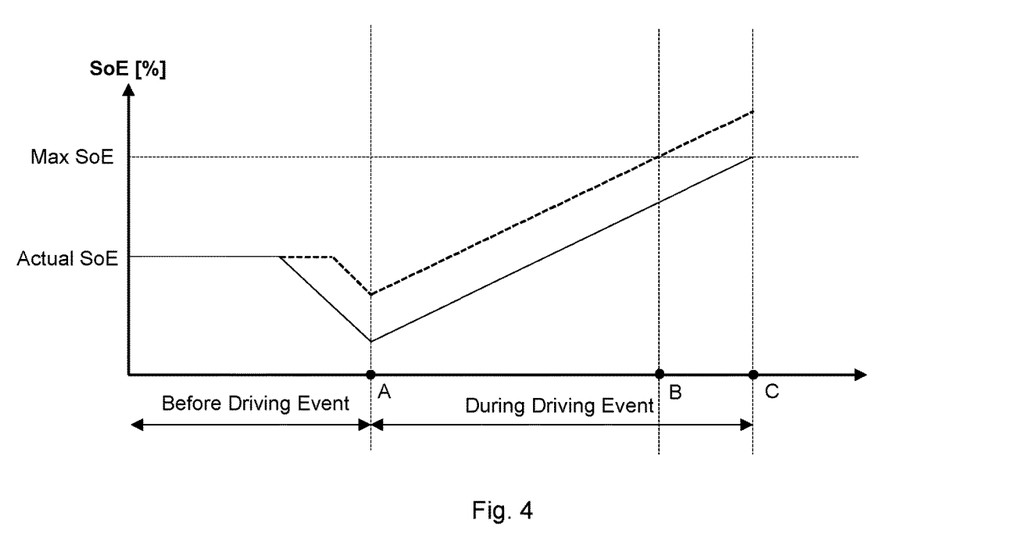
FIG. 4 is a graph illustrating one example where a preparation action has been performed in contrast to one example where the preparation action has not been performed before the start of a driving event.

FIG. 4 shows an example where a preparation action has been performed before the start of the predicted upcoming driving event in contrast to one example where the preparation action has not been performed before the start of an upcoming driving event.

The dash line represents the scenario where the preparation action has not been performed. In this case, the state-of-charge level of the energy storage system 120 is not reduced to an appropriate level in advance. As a result, the energy storage system 120 may be fully charged at point B, which is in the middle of the driving event. At this point, the fuel cell system 110 may either be turned off, which may result in additional aging of the fuel cell system 120, or may be kept on running with excessive power being wasted. The solid line represents the scenario where the preparation action has been performed. The state-of-charge level of the energy storage system 120 is reduced to an appropriate level before the start of the driving event, such that the energy storage system 120 is not fully charged until the end of the driving event. Accordingly, the fuel cell system 110 does not need to be turned off at point B, and no electric power will be wasted.

In response to determining that the preferred operating condition corresponds to turning off the fuel cell system 110, controlling the power system by performing a preparation action may comprise S6: initiating a cooling action of the fuel cell system 110 before turning off the fuel cell system 110.

The processor device 402 may communicate to a cooling system (not shown) to initiate the cooling action. In this way, the fuel cell system's temperature may be within a desirable range upon completing the driving event. The fuel cell system 110 may thereafter be operated at a desirable operating temperature, thus a risk of system degradation may be further reduced.

When the fuel cell system 110 is turned off, it may be preferable to operate the vehicle 100 by the energy storage system 120 as long as possible, such that the fuel cell system 110 does not need to be turned on before the end of the driving event. Therefore, it may be advantageous to charge the energy storage system 120 to a fully-charged level before turning off the fuel cell system 110. In this case, the vehicle 100 may be operated by the energy storage system 120 throughout the driving event.

S4, S5 and S6 are shown in FIG. 2 by boxes with dashed lines, meaning that the actions are optional.

Figure 5:
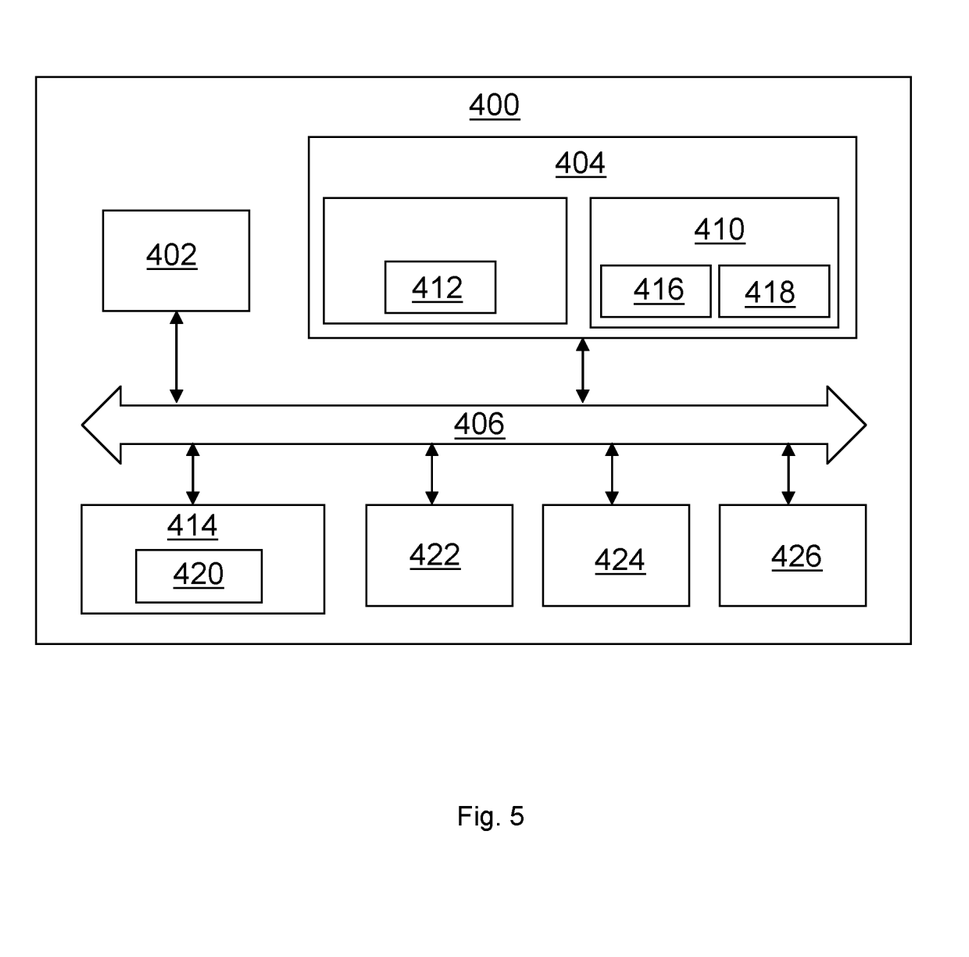
FIG. 5 is a schematic diagram of an exemplary computer system for implementing examples disclosed herein, according to one example.

The disclosure also relates to a computer system 400, as e.g. shown in FIG. 5. The computer system comprises a processor device 402 configured to control a power system of a vehicle. The power system 130 comprises a fuel cell system 110 and an energy storage system 120 comprising one or more batteries, wherein the fuel cell system 110 and the energy storage system 120 are adapted to produce electric power for one or more energy consumers 140 of the vehicle 100. The processor device 402 is further configured to:

predict an upcoming driving event associated with a start time and a time duration, the driving event being an event during which the vehicle 100 is expected to be operated under a load condition, determine a preferred operating condition of the fuel cell system 110 during the predicted upcoming driving event based on the load condition and on the time duration, the preferred operating condition corresponding to one of keeping the fuel cell system 110 running or turning off the fuel cell system 110, and control the power system 130 by performing a preparation action of the power system 130 in dependence of the determined preferred operating condition of the fuel system 120, wherein the preparation action is performed before the start time of the predicted upcoming driving event.

The computer system 400 may comprise at least one computing device or electronic device capable of including firmware, hardware, and/or executing software instructions to implement the functionality described herein. The computer system 400 may include one or more electronic control units 402, such as the control unit 402 illustrated in FIG. 1, which may also be referred to as a processor device, a memory 404, and a system bus 406. The computer system 400 may include at least one computing device having the control unit 402. The system bus 406 provides an interface for system components including, but not limited to, the memory 404 and the control unit 402. The control unit 402 may include any number of hardware components for conducting data or signal processing or for executing computer code stored in memory 404. The control unit 402 (e.g., processor device) may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The control unit may further include computer executable code that controls operation of the programmable device.

The system bus 406 may be any of several types of bus structures that may further interconnect to a memory bus (with or without a memory controller), a peripheral bus, and/or a local bus using any of a variety of bus architectures. The memory 404 may be one or more devices for storing data and/or computer code for completing or facilitating methods described herein. The memory 404 may include database components, object code components, script components, or other types of information structure for supporting the various activities herein. Any distributed or local memory device may be utilized with the systems and methods of this description. The memory 404 may be communicably connected to the control unit 402 (e.g., via a circuit or any other wired, wireless, or network connection)

and may include computer code for executing one or more processes described herein. The memory 404 may include non-volatile memory 408 (e.g., read-only memory (ROM), erasable programmable read-only memory (EPROM), electrically erasable programmable read-only memory (EEPROM), etc.), and volatile memory 410 (e.g., random-access memory (RAM)), or any other medium which can be used to carry or store desired program code in the form of machine-executable instructions or data structures and which can be accessed by a computer or other machine with a control unit 402. A basic input/output system (BIOS) 412 may be stored in the non-volatile memory 408 and can include the basic routines that help to transfer information between elements within the computer system 400.

The computer system 400 may further include or be coupled to a non-transitory computer-readable storage medium such as the storage device 414, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 414 and other drives associated with computer-readable media and computer-usable media may provide non-volatile storage of data, data structures, computer-executable instructions, and the like.

A number of modules can be implemented as software and/or hard-coded in circuitry to implement the functionality described herein in whole or in part. The modules may be stored in the storage device 414 and/or in the volatile memory 410, which may include an operating system 416 and/or one or more program modules 418. All or a portion of the examples disclosed herein may be implemented as a computer program product 420 stored on a transitory or non-transitory computer-usable or computer-readable storage medium (e.g., single medium or multiple media), such as the storage device 414, which includes complex programming instructions (e.g., complex computer-readable program code) to cause the control unit 402 to carry out the steps described herein. Thus, the computer-readable program code can comprise software instructions for implementing the functionality of the examples described herein when executed by the control unit 402. The control unit 402 may serve as a controller or control system for the computer system 400 that is to implement the functionality described herein, such as for the control system 4 illustrated in FIG. 2.

The computer system 400 also may include an input device interface 422 (e.g., input device interface and/or output device interface). The input device interface 422 may be configured to receive input and selections to be communicated to the computer system 400 when executing instructions, such as from a keyboard, mouse, touch-sensitive surface, etc. Such input devices may be connected to the processor device 402 through the input device interface 422 coupled to the system bus 406 but can be connected through other interfaces such as a parallel port, an Institute of Electrical and Electronic Engineers (IEEE) 1394 serial port, a Universal Serial Bus (USB) port, an IR interface, and the like. The computer system 400 may include an output device interface 424 configured to forward output, such as to a display, a video display unit (e.g., a liquid crystal display (LCD) or a cathode ray tube (CRT)). The computer system 400 may also include a communications interface 426 suitable for communicating with a network as appropriate or desired.

The operational steps described in any of the exemplary aspects herein are described to provide examples and discussion. The steps may be performed by hardware components, may be embodied in machine-executable instructions to cause a processor to perform the steps, or may be performed by a combination of hardware and software. Although a specific order of method steps may be shown or described, the order of the steps may differ. In addition, two or more steps may be performed concurrently or with partial concurrence.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A computer system comprising a processor device configured to control a power system of a vehicle, said power system comprising a fuel cell system and an energy storage system comprising one or more batteries, wherein said fuel cell system and said energy storage system are adapted to produce electric power for one or more energy consumers of the vehicle, the processor device further being configured to:

predict an upcoming driving event associated with a start time and a time duration, the driving event being an event during which the vehicle is expected to be operated under a load condition,     determine a preferred operating condition of the fuel cell system during the predicted upcoming driving event based on the load condition and on the time duration, the preferred operating condition corresponding to one of keeping the fuel cell system running or turning off the fuel cell system, and     control the power system by performing a preparation action of the power system in dependence on the determined preferred operating condition of the fuel cell system, wherein the preparation action is performed before the start time of the predicted upcoming driving event,     wherein determining the preferred operating condition of the fuel cell system comprises comparing the predicted time duration of the upcoming driving event with a reference time,     wherein, if the predicted time duration of the upcoming driving event is shorter than the reference time, the operating condition is determined to correspond to keeping the fuel cell system running, and wherein, if the predicted time duration of the upcoming driving event is longer than the reference time, the operating condition is determined to correspond to turning off the fuel cell system.

2. A vehicle comprising a power system adapted to produce electric power for one or more energy consumers of the vehicle, and further comprising the computer system according to claim 1.

3. A computer-implemented method for controlling a power system of a vehicle, by a processor device of a computer system, said power system comprising a fuel cell system and an energy storage system comprising one or more batteries, wherein said fuel cell system and said energy storage system are adapted to produce electric power for one or more energy consumers of the vehicle, the method comprising:

predicting, by the processor device, an upcoming driving event associated with a start time and a time duration, the driving event being an event during which the vehicle is expected to be operated under a load condition,     determining, by the processor device, a preferred operating condition of the fuel cell system during the predicted upcoming driving event based on the load condition and on the time duration, the preferred operating condition corresponding to one of keeping the fuel cell system running or turning off the fuel cell system, and     controlling, by the processor device, the power system by performing a preparation action of the power system in dependence on determined preferred operating condition of the fuel cell system, wherein the preparation action is performed before the start time of the predicted upcoming driving event,     wherein determining the preferred operating condition of the fuel cell system comprises comparing the predicted time duration of the upcoming driving event with a reference time,     wherein, if the predicted time duration of the upcoming driving event is shorter than the reference time, the operating condition is determined to correspond to keeping the fuel cell system running, and wherein, if the predicted time duration of the upcoming driving event is longer than the reference time, the operating condition is determined to correspond to turning off the fuel cell system.

4. The method according to claim 3, wherein the method further comprises:

in response to determining that the preferred operating condition corresponds to keeping the fuel cell system running, estimating, by the processor device, an amount of electric power that is expected to be generated by the fuel cell system throughout the predicted time duration of the predicted upcoming driving event, and     controlling, by the processor device, the power system by performing a preparation action in a way such that a state-of-energy level of the energy storage system is adjusted to a first level before the start time of the predicted upcoming driving event.

5. The method according to claim 4, wherein the first level corresponds to a state-of-energy level which allows the energy storage system to be charged to a target state-of-energy level by a portion of the estimated electric power from the fuel cell system during the predicted upcoming driving event.

6. The method according to claim 5, wherein the target state-of-energy level corresponds to a level which is sufficient for completing a subsequent expected driving task after the predicted upcoming driving event, or wherein the target state-of-energy level corresponds to a fully-charged level of the energy storage system.

7. The method according to claim 4, wherein performing a preparation action in a way such that a state-of-energy level of the energy storage system is adjusted to a first level before the start time of the predicted upcoming driving event comprises decreasing a power output from the fuel cell system.

8. The method according to claim 3, in response to determining that the preferred operating condition corresponds to turning off the fuel cell system, controlling the power system by performing a preparation action comprises initiating a cooling action of the fuel cell system before turning off the fuel cell system.

9. The method according to claim 3, wherein the upcoming driving event is an idling event.

10. The method according to claim 3, wherein the prediction of the upcoming driving event is based on historical driving statistics data or a pre-defined travelling plan.

11. A control system comprising one or more control units configured to perform the method of claim 2.

12. A non-transitory computer-readable storage medium comprising instructions, which when executed by the processor device, cause the processor device to perform the method of claim 3.

* * * * *